June 19, 1962 W. P. KERN 3,040,175
PENETRATIVE RADIATION COLLIMATOR
Filed Sept. 25, 1959 2 Sheets-Sheet 1
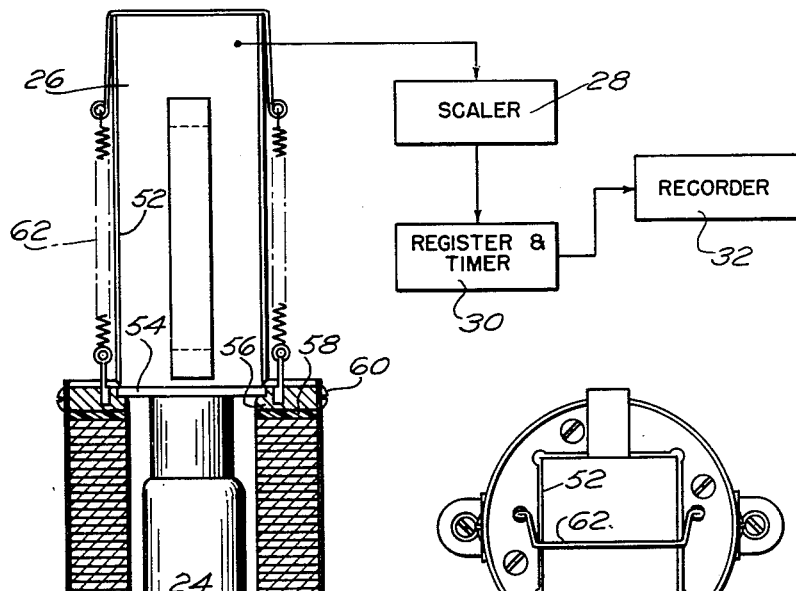
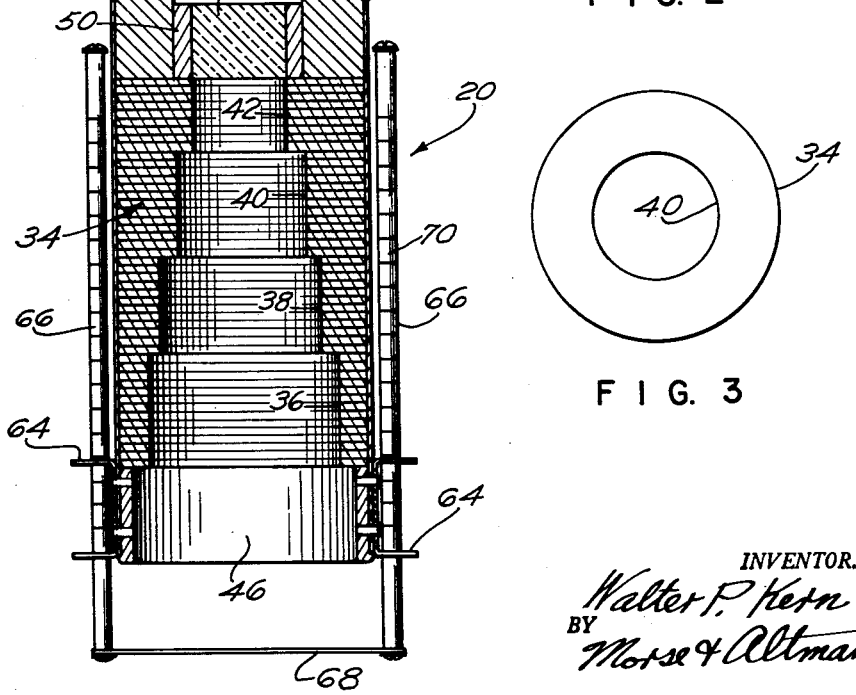
FIG. 1
FIG. 2
FIG. 3
INVENTOR.
Walter P. Kern
BY Morse & Altman
ATTORNEYS United States Patent Office 3,040,175
Patented June 19, 1962

3,040,175
PENETRATIVE RADIATION COLLIMATOR
Walter P. Kern, Cohasset, Mass., assignor to Baird-Atomic, Inc., Cambridge, Mass., a corporation of Massachusetts
Filed Sept. 25, 1959, Ser. No. 842,375
2 Claims. (Cl. 250—71.5)

The present invention relates to radiation detection and, more particularly, to a so-called "collimator" of the type which serves to predetermine the geometry of the path between a radiation source and a radiation detector. This geometry must be determined for appropriate calibration of the radiation detector. In other words, the radiation detector may be calibrated correctly in terms of intensity only if all of the increments of the solid angle subtended between the radiation source and the radiation detector are known. Customarily, in the case of disintegration counting, a sample is permitted to remain before the detector for a period required for the counter to reach a preset number of counts. This number of counts divided by the time span during which it occurs provides an indication of the radioactivity of the sample.

Portions of the collimator subtending the increments of the solid angle between the radiation source and the radiation detector must be composed of a heavy metal which absorbs all radioactive radiation outside of these solid angle increments. In the past, complex casting and machining operations have been necessary to mass produce collimators of desired configuration. The present invention contemplates a collimator which may be provided with any desired configuration accurately and simply. The primary object of the present invention is to provide a collimator of the foregoing type, comprising a stack of a plurality of heavy metal strata that are provided with apertures related in such a way as to define desired solid angle increments. The various strata can be mass produced by relatively simple casting, machining or punching and may be assembled simply in association with other detector components. The final solid angle increments may be of a variety of entrant and re-entrant shapes in cross-section.

Other objects of the present invention will in part be obvious and will in part appear hereinafter.

The invention accordingly comprises the apparatus possessing the construction, combination of elements and arrangement of parts, which are exemplified in the following detailed disclosure, and the scope of which will be indicated in the appended claims.

For a fuller understanding of the nature and objects of the present invention, reference should be had to the following detailed description, taken in connection with the accompanying drawings, wherein:

FIG. 1 is a partly sectional and partly diagrammatic view of a system comprising a collimator embodying the present invention;

FIG. 2 is a top plan view of the collimator of FIG. 1;

FIG. 3 is a plan view of one of the strata of the collimator of FIG. 1;

Figure 4:
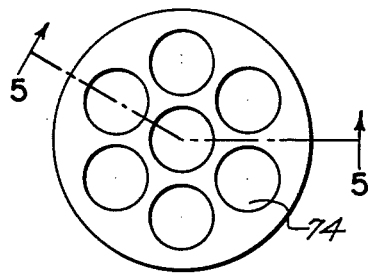
FIG. 4 is a top plan view of a sub-assembly of an alternative collimator embodying the present invention.
Figure 7:
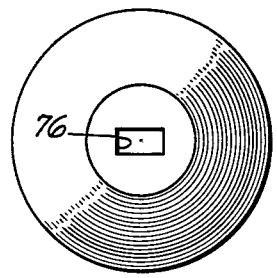
FIG. 7 is a top-plan view of a sub-assembly of another alternative collimator embodying the present invention.

Generally, FIG. 1 illustrates components of a radiation counting system comprising a collimator 20 for defining solid angle increments through which radiation is to be transmitted from a source, a luminescent element 22 which emits flashes of light in response to incident radiation and a photomultiplier tube 24 for generating signals in response to flashes emitted by element 22. Element 22 is a phosphor, for example, a derivative of benzene such as diphenyl or terphenyl, which responds to each penetrative radiation particle with a flash of light. The signals, after being amplified in a preamplifier 26, are proportionally reduced in number by a scaler 28 and are related to an elapsed period of time in a register and timer 30. The resulting data is represented in a recorder 32.

As is best shown in FIG. 1, collimator 20 includes a stack of discrete strata 34 of which successive groups of strata have diameters designated 36, 38, 40 and 42 of successively decreasing magnitude. These strata are composed of a heavy metal such as lead or uranium. All of the strata of sub-assembly 34, which have the same outside diameter, are aligned within a tubular casing 44 within which the strata are snugly seated. The lowermost stratum of sub-assembly 34 is seated against an annulus 46 which is riveted within tubular casing 44. The uppermost stratum of sub-assembly 34 is seated against an annular sleeve 48, which is fitted into tubular casing 44. Positioned centrally of the upper stratum of sub-assembly 34 is a suitable spacer 50 within which element 22 is secured and by which the transverse periphery of element 22 is shielded. Detector 24 is mounted on casing 52, which in turn is removably secured to the upper extremity of 20. Casing 26 includes a lower plate 54 which normally abuts against a shoulder 56 that is provided at the upper extremity of collimator 20 by a suitable ring 58. Ring 58 is secured within tubular casing 44 by such means as screws 60. Casing 52 is retained, by a suitable spring latch 62, in position with plate 54 in abutment against shoulder 56 and detector 24 within the cavity provided by shield 48. At the lower extremity of tubular column 44 are opposed pairs of apertured ears 64 which slidably and frictionally receive measuring rods 66. At the outer extremities of rods 66 is a contact ring 68. Measuring rods 66 are provided with indicia 70 which serve to indicate the distance of contact ring 68, and consequently a radiation source against which it is placed, from the remainder of the collimator in order that the collimator be precisely positioned with respect to the source.

Figure 5:
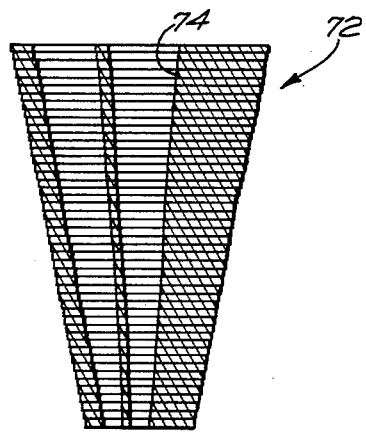
FIG. 5 is a cross-sectional view of the collimator of FIG. 4, the section being taken substantially along the line 4—4.
Figure 8:
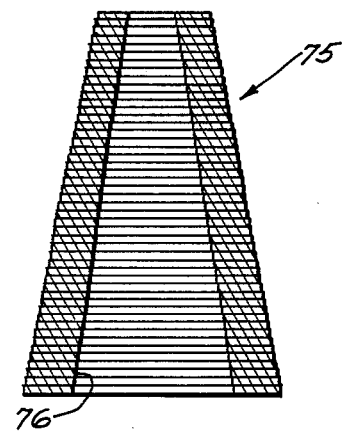
FIG. 8 is a cross-sectional view of the collimator of FIG. 7, the section being taken substantially along the line 8—8.
Figure 6:
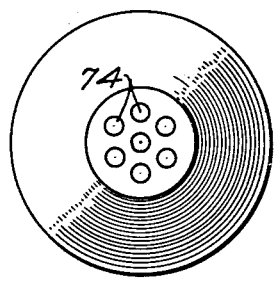
FIG. 6 is a bottom-plan view of the sub-assembly of FIG. 5.
Figure 9:
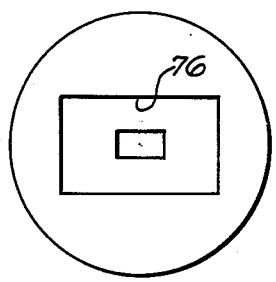
FIG. 9 is a bottom plan view of the sub-assembly of FIG. 7.

The sub-assemblies of FIGS. 4, 5 and 6 and FIGS. 7, 8 and 9 are adapted for use in a collimator of the type shown in FIG. 1 as including a movable contact ring 68, indicia rods 66, a fluorescent element 22, a detector 24, a preamplifier 26, a scaler 28, a register and timer 30 and a recorder 32. As shown, the sub-assembly of FIGS. 4, 5 and 6, is a focusing collimator, generally designated by 72. This sub-assembly comprises a stack of strata, composed of a heavy metal such as lead or uranium, each stratum of which includes a plurality of openings 74. Openings 74 are similarly distributed in the various strata but, in the axial direction, are of successively diminishing diameter and diminishing spacing. Similarly FIGS. 7, 8 and 9 disclose a sub-assembly 75 of strata centrally apertured at 76. The shapes of the apertures 76 are similar but their areas change sequentially along the axis of the sub-assembly. Apertures 76, which are of a type characterized, at least in part, by rectilinear boundaries, define a solid angle of a configuration difficult to produce by any other known technique.

In operation, the system of FIG. 1, including any of the sub-assemblies shown in FIGS. 1 through 9, is placed at a predetermined distance from a subject with the aid of contact ring 68 and indicia 70. Radiation from the subject is controlled by the sub-assembly of sequential strata in such a way as to energize scintillator 22 with radiation transmitted from a subject of given area through a path of given volume and configuration. In consequence, detector 24 emits a series of pulses which are scaled at 28, referenced with respect to time at 30 and recorded in the form of counts per minute at 32.

Since certain changes may be made in the above system without departing from the scope of the invention herein involved, it is intended that all matter contained in the above description shall be interpreted in an illustrative and not in a limiting sense.

What is claimed:

1. A penetrative radiation collimator comprising a tubular casing, a first sub-assembly and a second sub-assembly snugly contained within said tubular casing in sequence, said first sub-assembly including a plurality of flat strata disposed along the axis of said tubular casing, adjacent faces of said strata being in contact with one another, said strata being provided with apertures having internal peripheries, said strata being provided with boundaries having external peripheries, said external peripheries contacting the internal periphery of said casing, one end of said first sub-assembly being adjacent to one end of said tubular casing, said second sub-assembly including in sequence a luminescent element, a photomultiplier tube and spacing means having a tubular external periphery in contact with the internal periphery of said tubular casing, said spacing means containing said luminescent element and said photomultiplier tube, means for removably supporting said photomultiplier tube within said spacing means, said supporting means being connected to said tubular casing at its other end, and means at said one end of said tubular casing for positioning said detector with respect to a subject, said last mentioned means including a ring and means for adjustably spacing said ring with respect to said casing.

2. A penetrative radiation collimator comprising a tubular casing, a first sub-assembly and a second sub-assembly snugly contained within said tubular casing in sequence, said first sub-assembly including a plurality of flat strata disposed along the axis of said tubular casing, adjacent faces of said strata being in contact with one another, said strata being provided with apertures having internal peripheries, said strata being provided with guide regions, said casing being provided with guide regions, said guide regions of said strata and said guide regions of said casing being in contact, one end of said sub-assembly being adjacent to one end of said tubular casing, said second sub-assembly including in sequence a luminescent element, a photomultiplier tube and spacing means containing said luminescent element and said photomultiplier tube, means for removably supporting said photomultiplier tube within said spacing means, said supporting means being connected to said tubular casing at its other end, and means at said one end of said tubular casing for positioning said detector with respect to a subject.

References Cited in the file of this patent

UNITED STATES PATENTS

| | | |
|---|---|---|
| 1,960,097 | Barnard | May 22, 1934 |
| 2,463,635 | McIntosh | Mar. 8, 1949 |
| 2,844,736 | Johns et al. | July 22, 1958 |
| 2,848,624 | Friedman et al. | Aug. 19, 1958 |
| 2,881,329 | Peyser | Apr. 7, 1959 |
| 2,928,947 | Cherry | Mar. 15, 1960 |
| 2,942,109 | Bell et al. | June 21, 1960 |